US008010654B2

(12) United States Patent
Hunt et al.

(10) Patent No.: US 8,010,654 B2
(45) Date of Patent: Aug. 30, 2011

(54) METHOD, SYSTEM AND PROGRAM PRODUCT FOR MONITORING RESOURCES SERVICING A BUSINESS TRANSACTION

(75) Inventors: Christian L. Hunt, Cary, NC (US); Roger M. Meli, Raleigh, NC (US); Denilson Nastacio, Apex, NC (US); Balan Subramanian, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 543 days.

(21) Appl. No.: 11/614,220

(22) Filed: Dec. 21, 2006

(65) Prior Publication Data

US 2008/0155089 A1  Jun. 26, 2008

(51) Int. Cl.
*G06F 15/173* (2006.01)

(52) U.S. Cl. ........................................................ 709/224

(58) Field of Classification Search .................. 709/224
See application file for complete search history.

(56) References Cited

U.S. PATENT DOCUMENTS

| | | | |
|---|---|---|---|
| 7,039,701 B2* | 5/2006 | Wesley | 709/224 |
| 7,043,548 B2* | 5/2006 | Bouet | 709/224 |
| 7,069,318 B2* | 6/2006 | Burbeck et al. | 709/224 |
| 7,143,139 B2* | 11/2006 | Burbeck et al. | 709/206 |
| 2002/0129137 A1* | 9/2002 | Mills et al. | 709/224 |
| 2002/0174218 A1* | 11/2002 | Dick et al. | 709/224 |
| 2003/0097564 A1* | 5/2003 | Tewari et al. | 713/171 |
| 2003/0187973 A1* | 10/2003 | Wesley | 709/224 |
| 2003/0187974 A1* | 10/2003 | Burbeck et al. | 709/224 |
| 2003/0217139 A1* | 11/2003 | Burbeck et al. | 709/224 |
| 2003/0217140 A1* | 11/2003 | Burbeck et al. | 709/224 |
| 2004/0024861 A1* | 2/2004 | Coughlin | 709/224 |
| 2004/0181537 A1 | 9/2004 | Chawla et al. | |
| 2004/0264481 A1 | 12/2004 | Darling et al. | |
| 2005/0050549 A1 | 3/2005 | Joseph et al. | |
| 2005/0063377 A1* | 3/2005 | Bryant et al. | 370/389 |
| 2005/0065879 A1* | 3/2005 | Birch et al. | 705/40 |
| 2005/0080930 A1 | 4/2005 | Joseph | |
| 2005/0114455 A1* | 5/2005 | Conroy et al. | 709/206 |

(Continued)

OTHER PUBLICATIONS

Jan Schaefer, "An Approach for Fine-Grained Web Service Performance Monitoring", Distributed Applications and Interoperable Systems Lecture Notes in Computer Science, LNCS, Springer-Verlag, BE, vol. 4025, , May 2006, pp. 169-180, XP019034655.

(Continued)

*Primary Examiner* — Tammy T Nguyen
*Assistant Examiner* — James Edwards
(74) *Attorney, Agent, or Firm* — Yee & Associates, P.C.; Arthur J. Samodivitz

(57) ABSTRACT

A method, system and program product for monitoring resources servicing a business transaction is provided. The method includes providing a transaction manager that monitors a business transaction serviced by one or more resources, with each of the resources and the transaction manager having a protocol stack configured to send and receive load-monitoring headers in protocol messages. The method further includes specifying, in a protocol request header in a protocol request message, collection of performance metrics for a resource, collecting, by the resources, the performance metrics specified in the protocol request message and sending the performance metrics collected to the transaction manager, in a protocol response header in a protocol response message. Further, the method includes pre-configuring with policies the protocol stack on a subset of the resources, such that the pre-configured resources can act as monitoring agents on behalf of peer resources and send alerts to a resource manager.

20 Claims, 6 Drawing Sheets

U.S. PATENT DOCUMENTS

| | | | |
|---|---|---|---|
| 2006/0069717 A1* | 3/2006 | Mamou et al. | 709/203 |
| 2006/0095584 A1 | 5/2006 | Deolaliker et al. | |
| 2006/0242292 A1* | 10/2006 | Carter | 709/224 |
| 2007/0127485 A1* | 6/2007 | Kim et al. | 370/392 |
| 2008/0114690 A1* | 5/2008 | Skidmore et al. | 705/52 |

OTHER PUBLICATIONS

J A Farrell et al., "Web Services Management Approaches", IBM Systems Journal, vol. 41, No. 2, 2002, pp. 212-227, XP002475061.

V Kalogeraki et al., "Managing Distributed Objects in Peer-to-Peer Systems", IEEE Network, vol. 1, No. 18, Jan./Feb. 2004, pp. 22-29, XP002475062.

M P Papazoglou et al., "Web Services Management: A Survey", IEEE Internet Computing, vol. 9, No. 6, Nov. 2005, pp. 58-64, XP002475063.

W Zhou et al., "Extending SOA to Cover Unreliable Services on Internet", Proceedings of the 2nd IEEE International Symposium on Service-Oriented System Engineering, Oct. 2006, pp. 110-113, XP031027456.

A Hanemann et al., "PerfSONAR: A Service Oriented Architecture for Multi-domain Network Monitoring", Service-Oriented Computing—ICSOC 2005, Lecture Notes in Computer Science, LNCS, Springer-Verlag, BE, vol. 3826, 2005, XP019025538.

PCT Search Report.

* cited by examiner

METHOD, SYSTEM AND PROGRAM PRODUCT FOR MONITORING RESOURCES SERVICING A BUSINESS TRANSACTION

FIELD OF THE INVENTION

The present invention relates to a method, system and computer program product for monitoring resources servicing a business transaction in a service-oriented architecture (SOA). In particular, the present invention relates to a method, system and computer program product for decorating regular SOA exchanges with additional monitoring information, which is carried in the header portion of a response message along with the payload. Further, the invention relates to a method of cross inspecting a header in a response message received by a resource, whereby the resource acts as a monitoring agent on behalf of other peer resources.

BACKGROUND OF THE INVENTION

In today's business environment, customers are increasingly conducting online or electronic transactions with organizations and/or businesses, such as retailers, banking services, etc. In a typical scenario, a customer seeking to conduct an online transaction, accesses a business' web page via the Internet and then may have to supply personal information depending on the type of online transaction. For instance, if purchasing an item online, the customer typically has to provide personal information that identifies the customer, such as, name, address, a credit card number, etc. for purchasing the item. Invariably, the data for such online transactions may be handled by multiple computers on a network, where each computer may carry out one aspect of the transaction. Any one of these computers, if overloaded, etc., could lead to delays in processing the transaction, which could negatively impact the customer. As such, there is a need for a business and/or organization to provide a cost-effective way to develop monitoring systems that can track such electronic transactions in order to ensure that customers are kept satisfied.

SUMMARY OF THE INVENTION

In a first aspect of the invention, there is provided a method of monitoring resources servicing a business transaction in a service-oriented architecture. The method includes providing a transaction manager configured to monitor a business transaction serviced by one or more resources in a service-oriented architecture. In an embodiment, each of the one or more resources and the transaction manager has deployed thereon a protocol encoding-decoding component configured to send one or more protocol request messages requesting collection of performance metrics and configured to receive one or more protocol response messages containing the performance metrics collected. The method includes specifying in a protocol request header in a protocol request message collection of one or more performance metrics for at least one resource of the one or more resources servicing the business transaction, collecting the one or more performance metrics specified in the protocol request message and sending to the transaction manager, in a protocol response header in a protocol response message, the one or more performance metrics collected by the at least one resource of the one or more resources servicing the business transaction. In an embodiment, the transaction manager is configured to monitor one or more transaction metrics associated with the business transaction and is configured to analyze the one or more transaction metrics monitored for the business transaction in view of the one or more performance metrics collected from the one or more resources. The method further includes providing a resource manager configured to collect one or more performance metric events from one or more monitoring agents deployed on one or more resources of the one or more resources. The method further includes associating the protocol request header in the protocol request message with a thread of execution for the business transaction, and propagating the protocol request header in the protocol request message to any other requests made within the same thread of execution for the business transaction, wherein the protocol request header in the protocol request message is replicated through all exchanges associated with the business transaction. The method further includes pre-configuring at least a respective protocol encoding-decoding component corresponding to a respective resource of the one or more resources with policies, wherein the respective resource inspects an aggregate value for a performance metric of the one or more performance metrics in a respective protocol response header received from a succeeding resource and wherein the respective resource sends an alert to the resource manager when the pre-set value for the performance metric is exceeded. In an embodiment, the sending step further includes appending, by a respective preceding resource of the one or more resources, a respective set of performance metrics to a protocol response header in a protocol response message received from a respective succeeding resource of the one or more resources, and sending the protocol response message to the transaction manager. Further, in an embodiment, the sending step includes aggregating in the protocol response header of the protocol response message each of the one or more performance metrics corresponding to a resource of the one or more resources servicing any other requests made within the same thread of execution for the business transaction, and sending the protocol response message to the transaction manager. In an embodiment, the protocol includes Simple Object Access Protocol (SOAP).

In another aspect of the invention, there is provided a system for monitoring resources servicing a business transaction in a service-oriented architecture. The system includes one or more resources configured to service a business transaction, with a plurality of the one or more resources have deployed thereon a protocol stack. The system further includes a transaction manager having deployed thereon the protocol stack and being configured to issue in a protocol request header in a protocol request message to the plurality of the one or more resources to monitor one or more performance metrics for the business transaction serviced by the plurality of the one or more resources, each of the plurality of the one or more resources being configured to collect the one or more performance metrics for the business transaction and to aggregate the one or more performance metrics in a protocol response header in a protocol response message that is sent to the transaction manager, wherein the protocol request header in the protocol request message is associated with a thread of execution for the business transaction and wherein the protocol request header in the protocol request message is propagated to any other requests made within the same thread of execution for the business transaction, such that the protocol request header in the protocol request message is replicated through all exchanges associated with the business transaction. The system further includes a resource manager configured to collect one or more performance metric events from one or more monitoring agents deployed on the one or more resources. In an embodiment, the transaction manager is further configured to monitor one or more transaction metrics for the business transaction serviced by the one or more resources and is configured to analyze the one or more transaction metrics monitored for the one or more resources servicing the business transaction in view of the one or more performance metrics collected by the one or more resources. In an embodiment, a respective preceding resource of the plurality of the one or more resources is configured to append a respective set of performance metrics to the protocol response header in the protocol response message received from a respective succeeding resource of the one or more resources. In an embodiment, the protocol stack corresponding to one or more of the plurality of the one or more resources is pre-configured with policies in order to compare an aggregate value of a performance metric of the one or more performance metrics received in the protocol response header to a pre-set value for the performance metric, such that the one or more of the plurality of the one or more resources sends an alert to the resource manager when the pre-set value for the performance metric is exceeded. In an embodiment, the protocol stack is a Simple Object Access Protocol (SOAP) stack, the protocol request header is a Simple Object Access Protocol (SOAP) request header, the protocol response header is a Simple Object Access Protocol (SOAP) response header; the protocol request message is a Simple Object Access Protocol (SOAP) request message; and the protocol response message is a Simple Object Access Protocol (SOAP) response message.

In yet another aspect of the invention, there is provided a computer program product for monitoring metrics associated with a business transaction. The computer program product includes a computer readable medium, first program instructions to provide a transaction manager configured to specify, in a request header in a request message issued to one or more resources servicing a business transaction, collection of one or more performance metrics, each of the one or more resources and the transaction manager having deployed thereon a protocol stack. The computer program product further includes second program instructions to collect the one or more performance metrics specified in the request message and third program instructions to send to the transaction manager in a response header in a response message the one or more performance metrics collected by the one or more resources servicing the business transaction. In an embodiment, the second program instructions further include instructions to associate the request header in the request message with a thread of execution for the business transaction and to propagate the request header in the request message to any other request messages made within the thread of execution for the business transaction. Further, in an embodiment, the second program instructions further include instructions to append a respective set of performance metrics to the response header in the response message received from a succeeding resource of the one or more resources and to send the response message to the transaction manager. The computer program product further includes fourth program instructions to pre-configure the protocol stack deployed on the one or more resources with policies in order to compare an aggregate value of a performance metric of the one or more performance metrics in a respective response header received from a succeeding resource to a pre-set value for the performance metric and to send an alert to a resource manager when the pre-set value for the performance metric is exceeded. In an embodiment, the transaction manager is further configured to monitor one or more transaction metrics associated with the business transaction and is further configured to analyze the one or more transaction metrics monitored for the business transaction in view of the one or more performance metrics collected from the one or more resources. In an embodiment, the protocol stack is a Simple Object Access Protocol (SOAP) stack, the request header is a Simple Object Access Protocol (SOAP) request header, the response header is a Simple Object Access Protocol (SOAP) response header, the request message is a Simple Object Access Protocol (SOAP) request message, and the response message is a Simple Object Access Protocol (SOAP) response message. In an embodiment, each of the first, second, third and fourth program instructions are stored on the computer readable medium.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

Figure 1A:
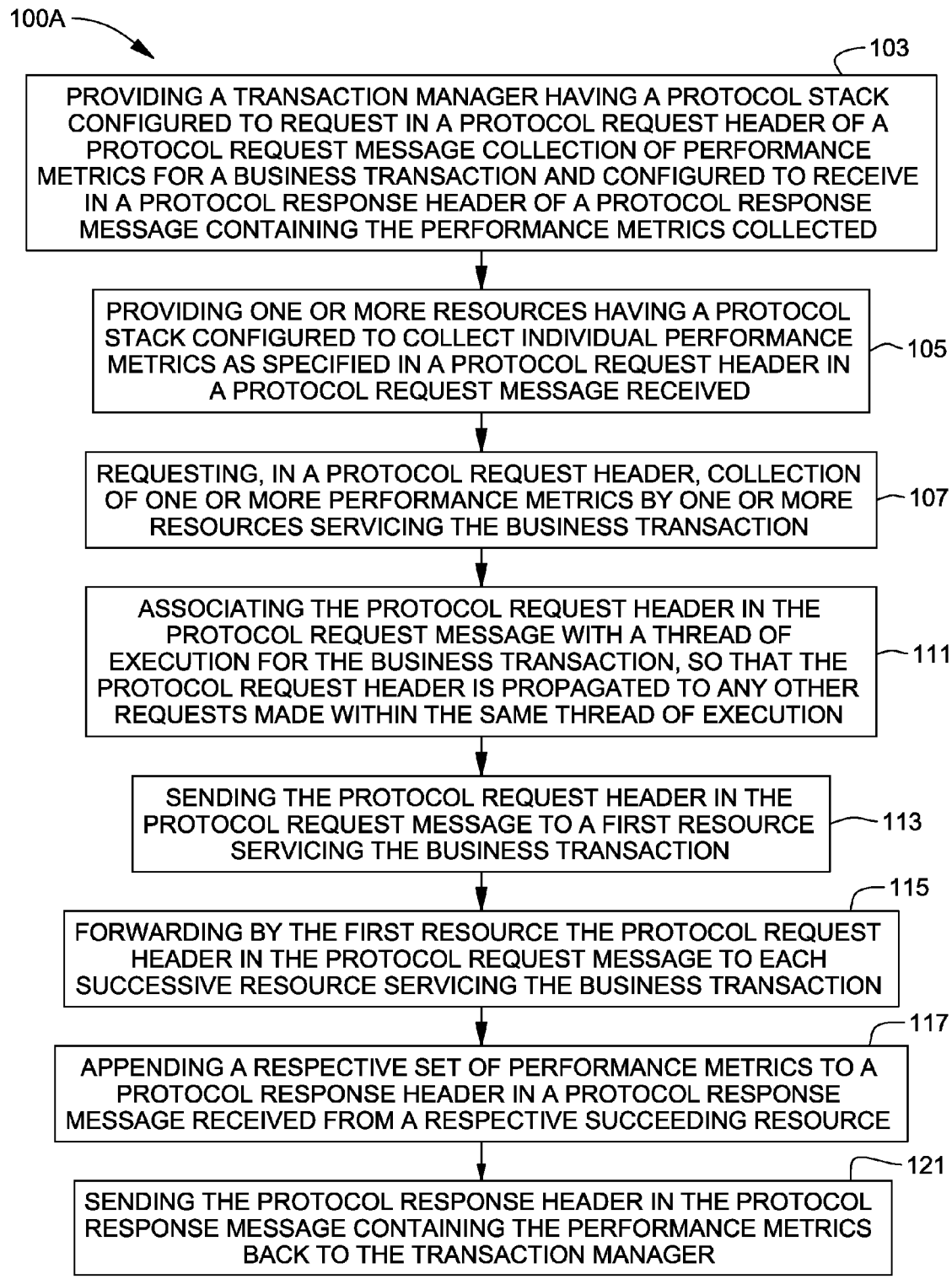
FIG. 1A depicts a flowchart outlining the steps involved in an embodiment of monitoring resources servicing a business transaction, in accordance with an embodiment of the present invention.
Figure 1B:
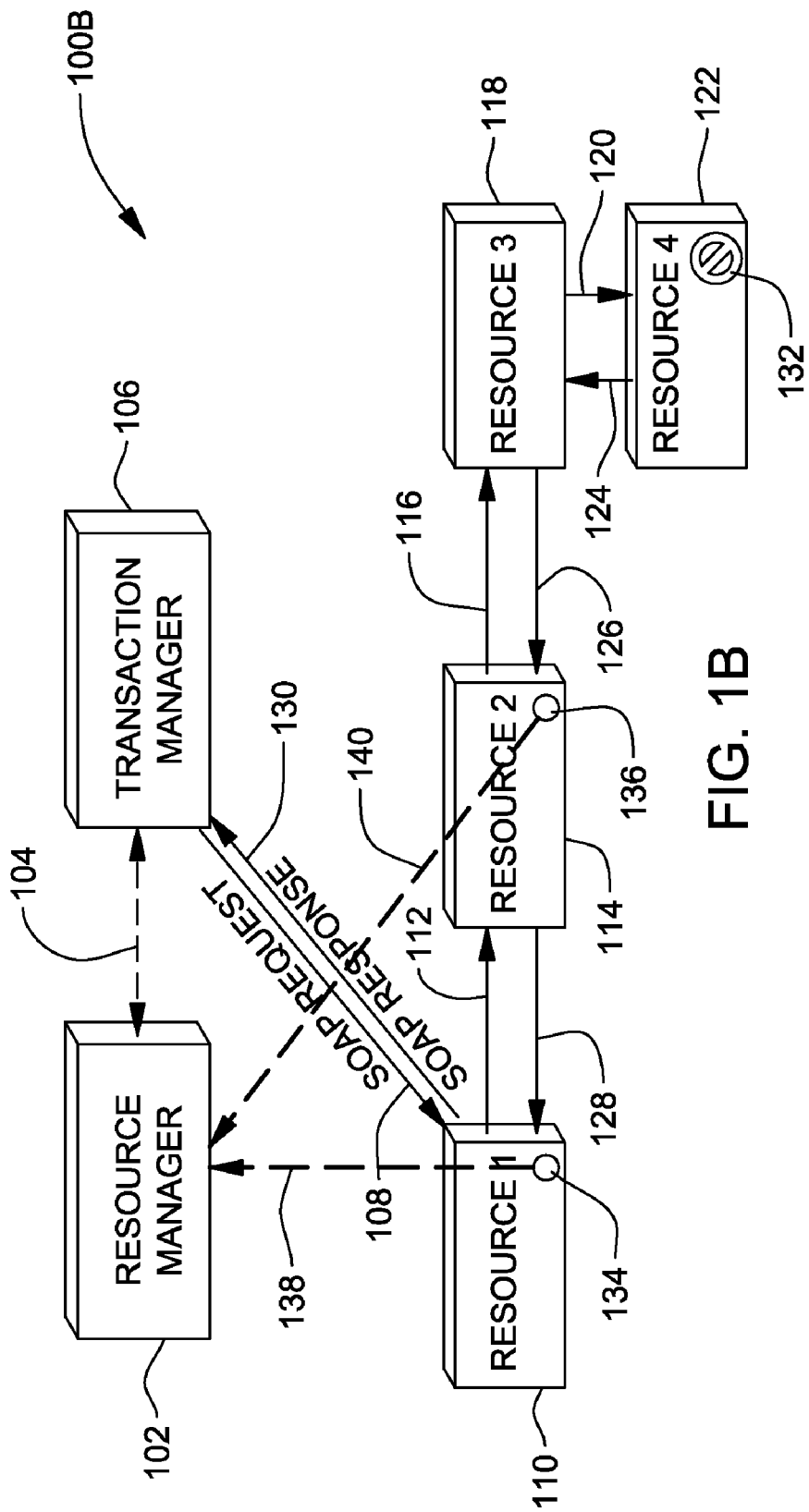
FIG. 1B is a schematic block system diagram illustrating an embodiment of a method and system for monitoring resources servicing a business transaction, corresponding to the method outlined in FIG. 1A, in accordance with an embodiment of the present invention.
Figure 2A:
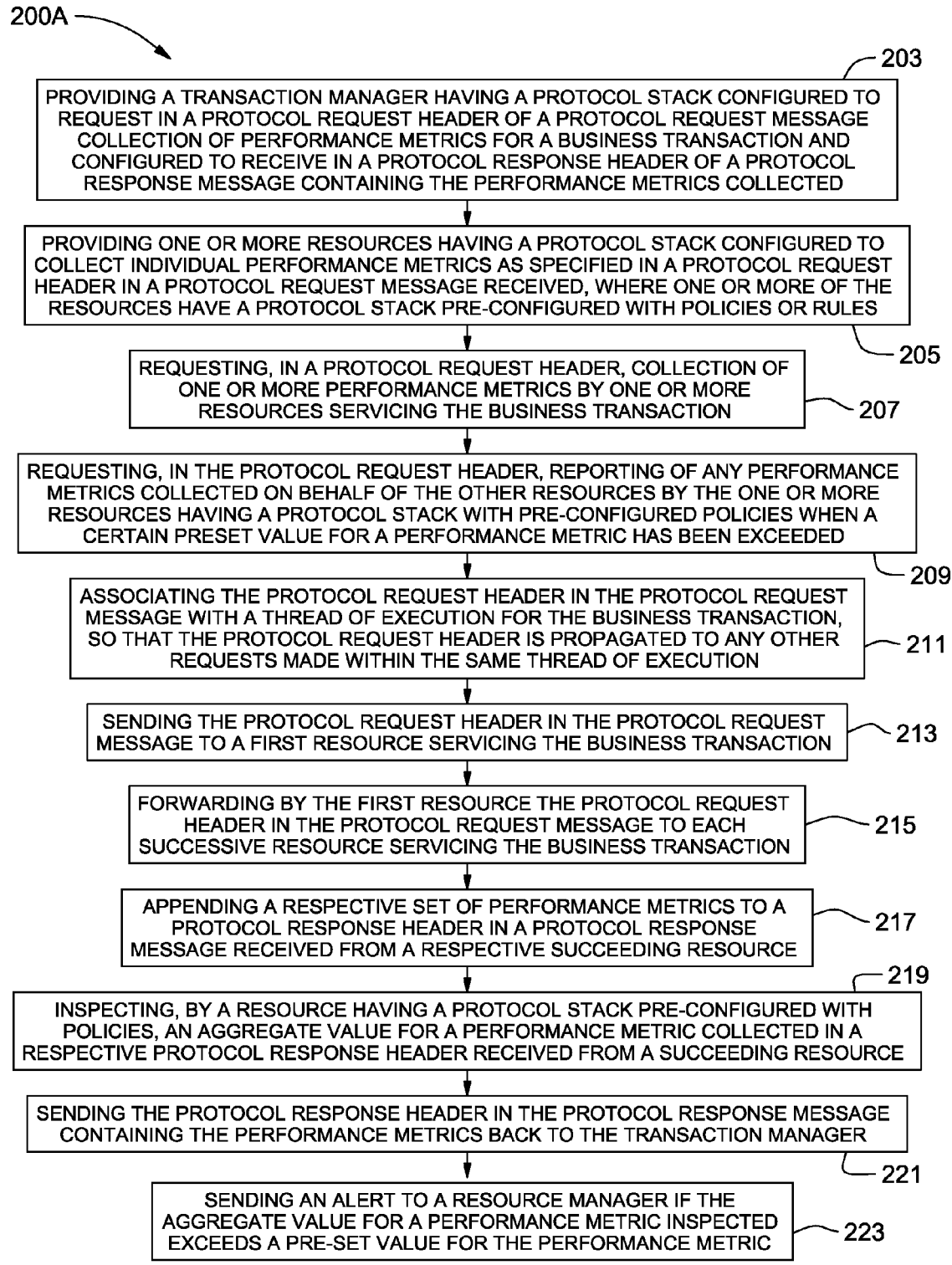
FIG. 2A depicts a flowchart outlining the steps involved in another embodiment of monitoring resources servicing a business transaction, wherein one or more resources additionally act as monitoring agents on behalf of peer resources, in accordance with an embodiment of the present invention.

Reference is now made to FIGS. 1A and 2A, which depict flowcharts outlining different embodiments of a method of monitoring resource or performance metrics or information across business method invocation. The term "business method invocation" refers to a simple request from one application to another application, such as "verify credit card number XYZ for a payment of $70". As shown in FIG. 1A, in an embodiment 100A, the method of monitoring resource metrics starts with providing in step 103 a transaction manager (discussed further herein below with respect to FIGS. 1B and 2B) that has a protocol stack that is configured to request in a protocol request header of a protocol request message collection of performance metrics for a business transaction and is further configured to receive in a protocol response header of a protocol response message containing the performance metrics collected by the resources. Further, the method includes providing in step 105 one or more resources having a protocol stack configured to collect individual performance metrics as specified in a protocol request header in a protocol request message received by the resources. In step 107, the method includes requesting, in a protocol request header, collection of one or more performance metrics by one or more resources servicing the business transaction and associating, in step 111, the protocol request header in the protocol request message with a thread of execution for the business transaction, so that the protocol request header is propagated to any other requests made within the same thread of execution. Further, the method includes sending, in step 113, the protocol request header in the protocol request message to a first resource servicing the business transaction, forwarding by the first resource, in step 115, the protocol request header in the protocol request message to each successive resource servicing the business transaction. The method further includes appending, in step 117, a respective set of performance metrics to a protocol response header in a protocol response message received from a respective succeeding resource and sending, in step 121, the protocol response header in the protocol response message containing the performance metrics back to the transaction manager.

Further, as shown in FIG. 2A, in another embodiment 200A, the method of monitoring resources servicing a business transaction includes providing a transaction manager, in step 203, that has a protocol stack configured to request in a protocol request header of a protocol request message collection of performance metrics for a business transaction and configured to receive in a protocol response header of a protocol response message containing the performance metrics collected. Further, the method includes providing one or more resources in step 205 that have a protocol stack configured to collect individual performance metrics as specified in a protocol request header in a protocol request message received, where one or more of the resources have a protocol stack pre-configured with policies or rules and in step 207 requesting, in a protocol request header, collection of one or more performance metrics by one or more resources servicing the business transaction. Further, the method includes in step 209 requesting, in the protocol request header, reporting of any performance metrics collected on behalf of the other resources by the one or more resources having a protocol stack with pre-configured policies when a certain preset value for a performance metric has been exceeded and associating in step 211 the protocol request header in the protocol request message with a thread of execution for the business transaction, so that the protocol request header is propagated to any other requests made within the same thread of execution. Furthermore, the method includes sending, in step 213, the protocol request header in the protocol request message to a first resource servicing the business transaction. In step 215, the method includes forwarding by the first resource the protocol request header in the protocol request message to each successive resource servicing the business transaction. As such, the method includes appending in step 217 a respective set of performance metrics to a protocol response header in a protocol response message received from a respective succeeding resource and inspecting by a resource having a protocol stack pre-configured with policies, in step 219, an aggregate value for a performance metric collected in a respective protocol response header received from a succeeding resource, and sending in step 221, the protocol response header in the protocol response message containing the performance metrics back to the transaction manager. Further, the method includes sending in step 223 an alert to a resource manager if the aggregate value for a performance metric inspected exceeds a pre-set value for the performance metric.

Figure 2B:
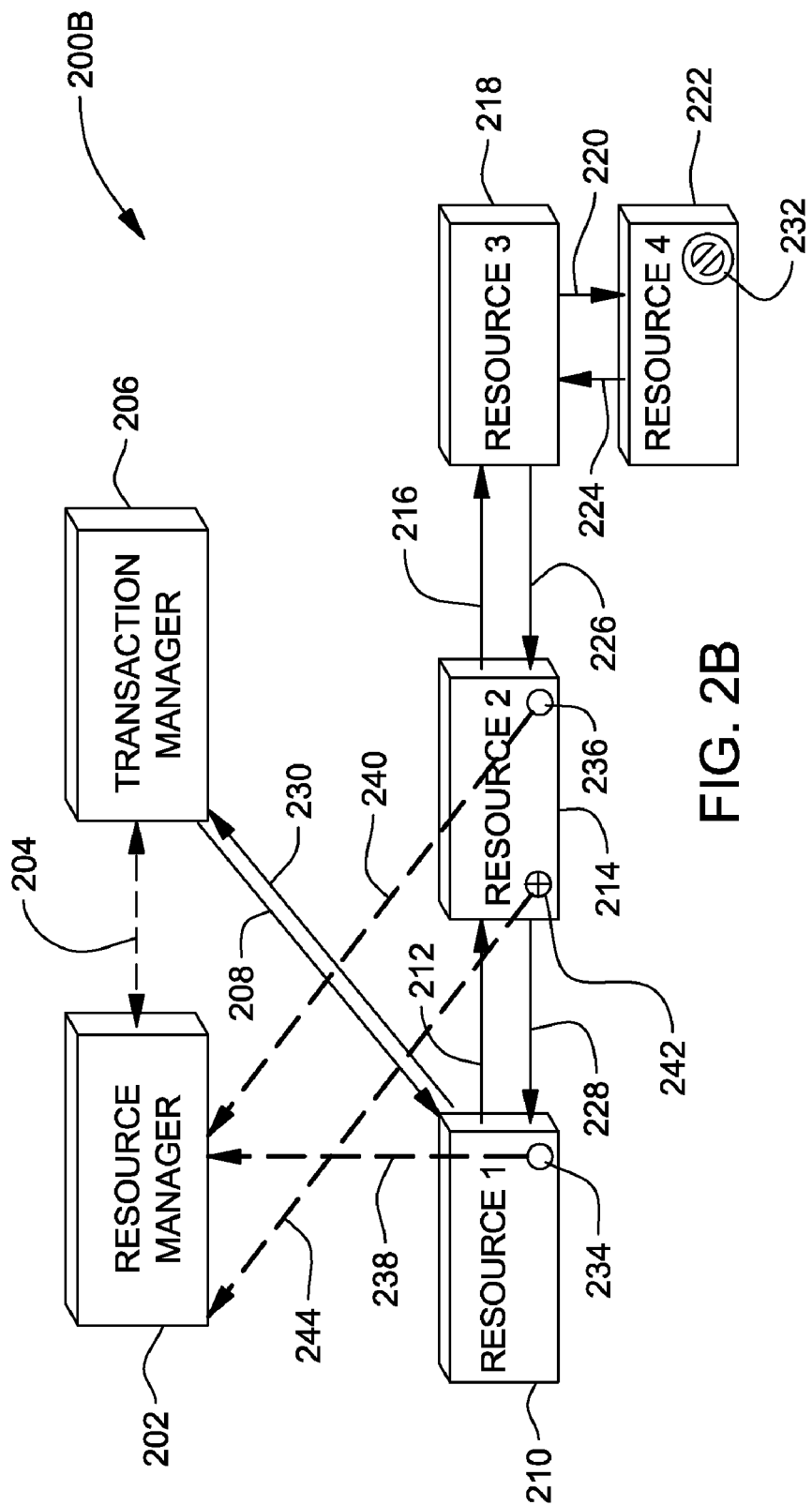
FIG. 2B is a schematic block system diagram illustrating another embodiment of a method and system for monitoring resources servicing a business transaction, corresponding to the method outline in FIG. 2A, in accordance with an embodiment of the present invention.

Further, reference is now made to FIGS. 1B and 2B, which depict the various embodiments of the method or process steps carried out by various components involved in a business transaction, as outlined above in FIGS. 1A and 2A herein above. In particular the method outlined above for FIG. 1A corresponds to the embodiment shown in FIG. 1B, whereas, the method outlined above for FIG. 2A corresponds to the embodiment shown in FIG. 2B. Since there are aspects of both embodiments 100B and 200B that are similar, the similar aspects will be described together with respect to FIGS. 1B and 2B, whereas, separate features will be discussed separately herein below. As shown in FIGS. 1B and 2B, the method of monitoring resources servicing a business transaction comprises providing a transaction manager 106 (206 in FIG. 2B) configured to monitor a business transaction serviced by one or more resources 110, 114, 118 and 122 (210, 214, 218 and 222 in FIG. 2B) in a service-oriented architecture (SOA). Business transactions implemented using a Service-Oriented Architecture (SOA) refers to the calls made from a resource providing one web service to another resource providing another web service. A resource may be any device, machine or system that services a business transaction, such as, a web server, a credit card verification system, a database server, an e-mail server, etc. Further, a transaction manager 106 (206 in FIG. 2B) is an application or system that monitors or collects transaction metrics or transaction data associated with the business transaction with respect to what an end user is experiencing. In particular, the transaction manager 106 (206 in FIG. 2B) may track transaction metrics, such as, how much time a business transaction took from an end user's perspective and/or how much time was spent by each resource 110, 114, 118 and/or 122 (210, 214, 218 and/or 222 in FIG. 2B) that processed a business transaction, etc. The transaction manager 106 (206 in FIG. 2B) tracks such transaction metrics or transaction information and may send a breakdown of time spent by each resource to an administrator at a remote location, so that the administrator can take appropriate action, as necessary. However, as disclosed in the method embodiments of FIGS. 1B and 2B, the transaction manager 106 (206 in FIG. 2B) is configured to track performance or resource or resource-level metrics for the one or more resources servicing a business transaction, such that the transaction manager 106 (206 in FIG. 2B) can interpret the transaction metrics that are tracked in view of the performance metrics for the individual resources that are gathered, as discussed herein below. FIGS. 1B and 2B show a business transaction that is serviced (indicated with solid arrows 112, 116, 120, 124, 126 and 128 in FIG. 1B; 212, 216, 220, 224, 226 and 228 in FIG. 2B) by four resources, namely, resource 1 (reference numerals 110 in FIG. 1B and 210 in FIG. 2B), resource 2 (reference numerals 114 in FIG. 1B and 214 in FIG. 2B), resource 3 (reference numerals 118 in FIG. 1B and 218 in FIG. 2B) and resource 4 (reference numeral 122 in FIG. 1B and 222 in FIG. 2B). For instance, resource 1 (reference numerals 110 in FIG. 1B and 210 in FIG. 2B) may be a web server and the web server 110 (210 in FIG. 2B) calls (arrow 112 in FIG. 1B and arrow 212 in FIG. 2B) resource 2 (reference numeral 114 in FIG. 1B, 214 in FIG. 2B) for a web service and resource 2 calls (arrow 116 in FIG. 1B and 216 in FIG. 2B) resource 3 (reference numeral 118 in FIG. 1B and 218 in FIG. 2B) for another web service and resource 3 calls (arrow 120 in FIG. 1B and 220 in FIG. 2B) resource 4 (reference numeral 122 in FIG. 1B and 222 in FIG. 2B) for yet another web service. For instance, resource 2 (reference numeral 114 in FIG. 1B and 214 in FIG. 2B) may be a "shopping cart checkout" server that a customer accesses when placing an item in a shopping cart, whereas, resource 3 (reference numeral 118 in FIG. 1B and 218 in FIG. 2B) may be a "product in-stock verification" server that checks to see whether or not the item is in stock, whereas, resource 4 (reference numeral 122 in FIG. 1B and 222 in FIG. 2B) may be a "credit card verification" server that verifies the customer's credit card information supplied for the business transaction. Alternatively, for instance, resource 2 (reference numeral 114 in FIG. 1B and 214 in FIG. 2B) may call a shipment department (not shown in FIGS. 1B and 2B) to check whether or not an item or product is in inventory and then resource 2 calls (arrow 120 in FIG. 1B and 220 in FIG. 2B) resource 3 (reference numeral 118 in FIG. 1B and 218 in FIG. 2B) and then resource 3 calls (arrow 120 in FIG. 1B and 220 in FIG. 2B) resource 4 (reference numeral 122 in FIG. 1B and 222 in FIG. 2B).

Figure 3:
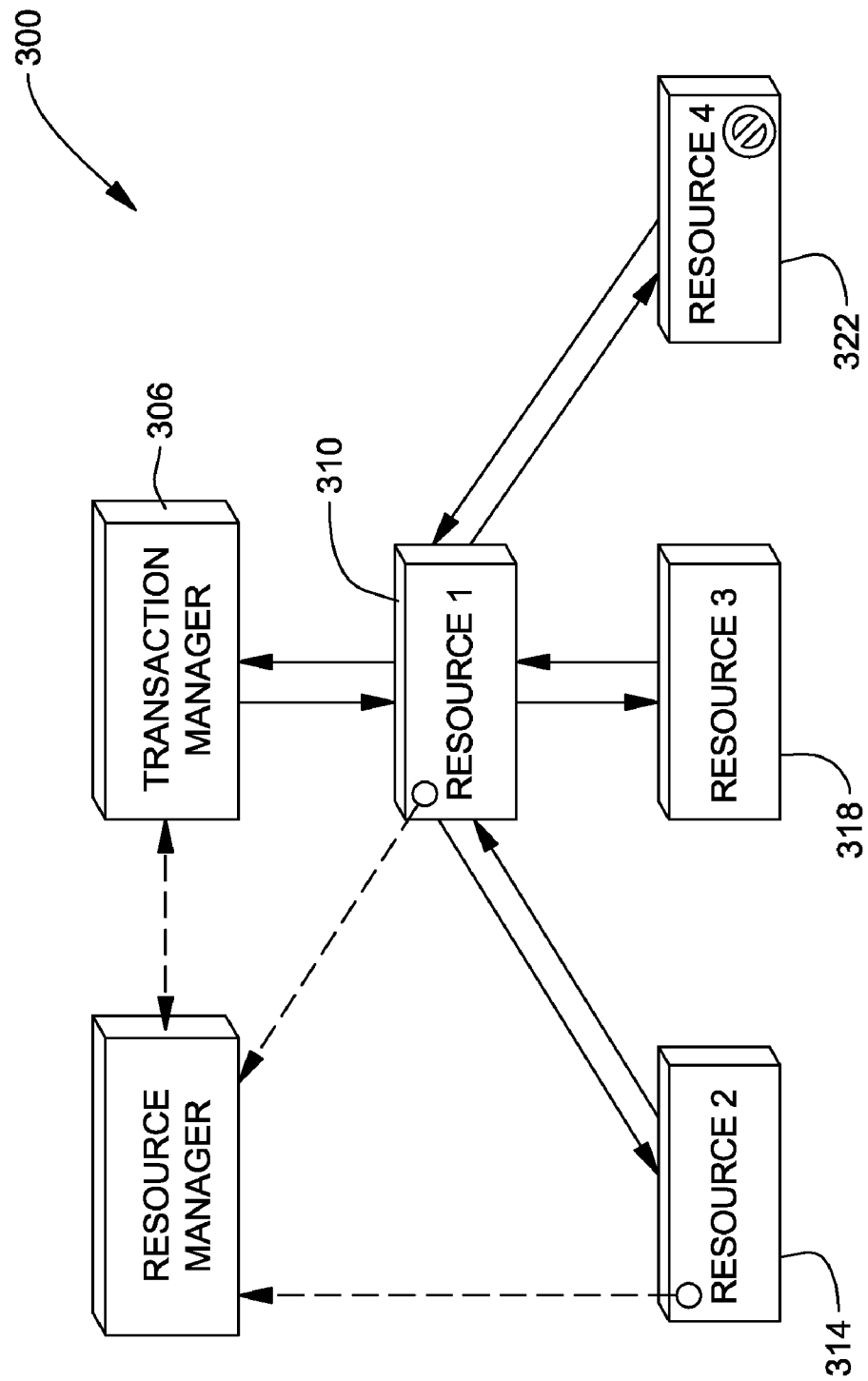
FIG. 3 is a schematic block system diagram illustrating yet another embodiment of a method and system for monitoring resources servicing a business transaction in a service-oriented architecture, in accordance with an embodiment of the present invention.

Although the business transaction flow is shown in a linear manner in FIGS. 1B and 2B, as shown in FIG. 3, the business transaction flow may not be linear in that there may be other steps or processes that are carried out simultaneously by a resource. As shown in the embodiment 300 in FIG. 3, the transaction manager 306 sends a request message to resource 1 (reference numeral 310), which in turn, sends messages to resource 2 (reference numeral 314), resource 3 (reference numeral 318) and resource 4 (reference numeral 322) simultaneously. For instance, resource 1 (reference numeral 310) may be a web server, that contacts resource 2 (reference numeral 314), which may be a database server for checking inventory, whereas, resource 3 (reference numeral 318) may be a credit card verification server and resource 4 (reference numeral 322) may be an e-mail server that sends a message regarding the business transaction. Accordingly, each of the resources, resource 4 (reference numeral 322), resource 3 (reference numeral 318) and resource 2 (reference numeral 314) sends its own response back to resource 1 (reference numeral 310), which sends the response back to the transaction manager 306. FIG. 3 is used here only to show an example of a non-linear transaction and will not be discussed in detail given that the teachings of FIGS. 1B and 2 are applicable to FIG. 3 as well. Going back to FIGS. 1B and 2B, in an embodiment, each of the four resources, 110 (210 in FIG. 2B), 114 (214 in FIG. 2B), 118 (218 in FIG. 2B), and/or 122 (222 in FIG. 2B), and the transaction manager 106 (206 in FIG. 2B) has deployed thereon an instrumented protocol encoding-decoding component or an instrumented protocol stack. Alternatively, the transaction manager 106 (206 in FIG. 2B) and only a subset of the four resources, 110, 114, 118 and 122 (210, 214, 218 and 222 in FIG. 2B) may have an instrumented protocol. In an embodiment, the transport protocol for business transactions implemented using a service-oriented architecture (SOA) is SOAP (Simple Object Access Protocol). A "protocol stack" or "SOAP stack" or an "encoding-decoding component" refers to the layer of software used to encode and decode protocol messages, in particular, SOAP messages. A SOAP message is a text message using a markup language (XML—Extensible Markup Language), where the message has distinct parts: the body or payload and the header. A SOAP message contains one body but may contain one or more headers. A header in a message contains information intended for the transmission nodes between the caller and the respondent, including themselves, such as "return the response to this address" or "this message is part of a larger transaction number 987". As such, each header in a SOAP message may serve a completely different purpose, such as defining security permissions, transaction markers, delivery parameters, etc. The body or payload contains the message intended from the caller to the respondent, such as "verify credit card number XYZ for a payment of $70" or the response from the respondent to the caller, such as "credit approved". In particular, an "instrumented protocol stack" refers to a protocol stack that has the addition functionality, which allows the protocol stack (the layer of software that knows how to encode and decode SOAP messages) to understand the headers (also referred to as "load-monitoring" headers) that request resource-level data or information or performance metrics, in addition to a request carried in the payload of the message, as described herein above with respect to FIGS. 1A and 2A. As such, any other exchange protocol that implements the same concepts of body/header separation in message exchanges, such as SOAP, can be used for practicing the methods of this invention.

Referring to FIGS. 1B and 2B, the transaction manager 106 (206 in FIG. 2B) having an instrumented SOAP stack, issues a SOAP request message 108 (208 in FIG. 2B) to resource 1, reference numeral 110 (210 in FIG. 2B). In particular, the SOAP request message 108 (208 in FIG. 2B) contains a SOAP header that requests collection of one or more performance or resource metrics by one or more of the four resources 110, 114, 118 and 122 (210, 214, 218 and 222) servicing the business transaction, in addition, to any other requests that may be carried in other headers and the actual request carried in the body or payload of the SOAP request message 108 (208 in FIG. 2B). Some examples of performance metrics that can be collected for a resource may include Central Processing Unit (CPU) usage, memory paging, disk usage, disk freespace, disk fragmentation, memory utilization, thread counts, number of processes, bytes read (network I/O), bytes written (network I/O), etc. In particular, as shown in FIGS. 1B AND 2B, the request information for collecting the one or more performance metrics is specified and carried out in a protocol request header (SOAP request header) of a protocol request message (SOAP request message) is forwarded (solid arrows 108, 112, 116 and 120; solid arrows 208, 212, 216 and 220 in FIG. 2B) to each of the resources 110, 114, 118 and 122 (210, 214, 218 and 222 in FIG. 2B), whereas, the performance metrics collected by the one or more resources servicing the business transaction is sent back (solid arrows 124, 126, 128 and 130; solid arrows 224, 226, 228 and 230) to the transaction manager 106 (206 in FIG. 2B) in a protocol response header (SOAP response header) in a protocol response message (SOAP response message). Moreover, each of the resources 110, 114, 118 and 122 (210, 214, 218 and 222 in FIG. 2B) associates the protocol (SOAP) request header in the protocol (SOAP) request message with a thread of execution for the business transaction, thus, propagating the protocol (SOAP) request header in the protocol (SOAP) request message to any other requests made within the same thread of execution for the business transaction.

As mentioned herein above, preferably each of the four resources 110, 114, 118 and 122 (210, 214, 218 and 222 in FIG. 2B) as well as the transaction manager 106 (206 in FIG. 2B) has an instrumented SOAP stack, so that as the SOAP request message is issued (arrow 108 in FIG. 1B; arrow 208 in FIG. 2B) from the transaction manager 106 (206 in FIG. 2B) to resource 1 (reference numeral 110 in FIG. 1B and 210 in FIG. 2B), the instrumented SOAP stack on resource 1 is able to follow the instructions in the request header in the SOAP request message 108 (208 in FIG. 2B). Accordingly, resource 1 collects the performance metrics that are requested by the transaction manager 106 (206 in FIG. 2B) in the SOAP header of the SOAP request message 108 (208 in FIG. 2B). Similarly, as the request message 108 (208 in FIG. 2B) is forwarded, resource 1 (reference numeral 110) propagates the request header contained in the SOAP request message 108 (208 in FIG. 2B) and sends it (arrow 112 in FIG. B; arrow 212 in FIG. 2B) to resource 2 (reference numeral 114 in FIG. 1B and 214 in FIG. 2B), such that, the instrumented SOAP stack on resource 2 collects its own performance metrics for resource 2 that are requested by the transaction manager 106 (206 in FIG. 2B) in the SOAP header of the SOAP request message 108 (208 in FIG. 2B). Again, as the message 108 (208 in FIG. 2B) is forwarded from resource 2 (reference numeral 114 in FIG. 1B and 214 in FIG. 2B) to resource 3 (reference numeral 118 in FIG. 1B and 218 in FIG. 2B), resource 2 propagates the request header contained in the SOAP request message 108 (208 in FIG. 2B) and sends it (arrow 116 in FIG. B; arrow 216 in FIG. 2B) to resource 3, so that the instrumented SOAP stack on resource 3 collects its own performance metrics for resource 3 that are requested by the transaction manager 106 (206 in FIG. 2B) in the SOAP header of the SOAP request message 108 (208 in FIG. 2B). Moreover, as the message 108 (208 in FIG. 2B) is forwarded from resource 3 (reference numeral 118 in FIG. 1B and 218 in FIG. 2B) to resource 4 (reference numeral 122 in FIG. 1B and 222 in FIG. 2B), resource 3 propagates the request header contained in the SOAP request message 108 (208 in FIG. 2B) and sends it (arrow 120 in FIG. 1B; arrow 220 in FIG. 2B) to resource 4, such that the instrumented SOAP stack on resource 4 collects its own performance metrics that are requested by the transaction manager 106 (206 in FIG. 2B) in the SOAP header of the SOAP request message 108 (208 in FIG. 2B). As a result, the protocol (SOAP) request header in the protocol (SOAP) request message is replicated through all exchanges or messages associated with the business transaction.

In an embodiment, the instrumented SOAP stacks on each of the resources 110, 114, 118 and 122 (210, 214, 218 and 222 in FIG. 2B) collects performance metric or resource metric information and adds or appends the information collected to SOAP response headers in a response message pertaining to the business transaction request. In particular, the performance metrics collected by resource 4 (reference numeral 122 in FIG. 1B and 222 in FIG. 2B) is added to a SOAP response header in a SOAP response message that is sent back (arrow 124 in FIG. 1B; arrow 224 in FIG. 2B) from resource 4 (reference numeral 122 in FIG. 1B and 222 in FIG. 2B) to resource 3 (reference numeral 118 in FIG. 1B and 218 in FIG. 2B). In turn, resource 3 (reference numeral 118 in FIG. 1B and 218 in FIG. 2B) adds the performance metrics collected by resource 3 to the SOAP response header in the SOAP response message received from resource 4 and sends it back (arrow 126 in FIG. B; arrow 226 in FIG. 2B) to resource 2 (reference numeral 114 in FIG. 1B and 214 in FIG. 2B), which in turn adds the performance metrics collected by it to the SOAP response header in the SOAP response message received from resource 3 and sends it back (arrow 128) to resource 1 (reference numeral 110 in FIG. 1B and 210 in FIG. 2B). Again, resource 1 adds performance metrics collected by it to the SOAP response header in the SOAP response message received from resource 2 and sends (arrows 130 in FIG. B; arrow 230 in FIG. 2B) the SOAP response message back to the transaction manager 106 (206 in FIG. 2B). Further, the instrumented SOAP stack aggregates, in the SOAP response header of the SOAP response message sent to the transaction manager 106 (206 in FIG. 2B), each of the one or more performance metrics collected for a resource servicing any other requests made within the same thread of execution for the business transaction before sending the SOAP response message to the transaction manager. Moreover, since the instrumented SOAP stack on each resource is responsible for collecting metrics for the resource, it is preferable that each resource has an instrumented SOAP stack that can collect performance metrics, but it is not necessary. So if each of the resources 110, 114, 118 and 122 (210, 214, 218 and 222 in FIG. 2B) has installed thereon an instrumented SOAP stack, the instrumented SOAP stack on a preceding resource can add its own performance metrics to the response header they received from a successive resource they called. Accordingly, the final response header in the SOAP response message sent (solid arrow 130 in FIG. 1B; solid arrow 230 in FIG. 2B) to the transaction manager 106 (206 in FIG. 2B) contains one response header with the performance metrics for each of the resources 110, 114, 118 and 122 (210, 214, 218 and 222 in FIG. 2B) contributing to a comprehensive answer. However, if a resource has a SOAP stack that is non-instrumented (a non-instrumented SOAP stack), the non-instrumented SOAP stack simply passes the performance or resource load-monitoring headers to a successive resource without collecting its own performance metrics. Hence, the performance metrics for a non-instrumented SOAP stack on a resource will not be included in the final response header in the response message delivered to the transaction manager.

In an embodiment, the method further comprises providing a resource manager 102 (202 in FIG. 2B) that is configured to collect one or more performance metric events from one or more monitoring agents deployed on one or more of the resources 110, 114, 118 and/or 122 (210, 214, 218 and/or 222 in FIG. 2B) in order to manage the resources. A resource manager 102 (202 in FIG. 2B) is an application that is configured to receive events from a monitoring agent running on a resource. Further, a monitoring agent is a program that is run on one or more resources, whose task is to monitor performance or resource metrics on those resources, such as, CPU data, disk usage, etc. If the monitoring agent observes something that is problematic, for example, that the CPU on a resource has reached a 70% threshold, the monitoring agent generates an event (also referred to as performance metric event) and sends it to the resource manager 102 (202 in FIG. 2B). For instance, as shown in FIGS. 1B AND 2B, resource 1 (reference numeral 110 in FIG. 1B and 210 in FIG. 2B) has a monitoring agent 134 (234 in FIG. 2B) that collects performance metrics on resource 1. The performance metrics collected by the monitoring agent 134 (234 in FIG. 2B) may be different than the one requested by the transaction manager 106 (206 in FIG. 2B). The monitoring agent 134 (234 in FIG. 2B) sends (dotted arrow 138 in FIG. 1B; dotted arrow 238 in FIG. 2B) the performance metrics collected for resource 1 to a resource manager 102 (202 in FIG. 2B). The resource manager 102 (202 in FIG. 2B) is configured to receive alerts (dotted arrow 138 in FIG. 1B; arrow 238 in FIG. 2B) from the monitoring agent 134 (234 in FIG. 2B) running on resource 1 (reference numeral 110 in FIG. 1B and 210 in FIG. 2B) when a performance metric for resource 1 has exceeded a pre-set value, so that the resource manager 102 (202 in FIG. 2B) may take any appropriate actions needed. Similarly, resource 2 (reference numeral 114 in FIG. 1B and 214 in FIG. 2B) has a monitoring agent 136 (236 in FIG. 2B) that collects performance metrics for resource 2. Again, the monitoring agent 136 (236 in FIG. 2B) sends (dotted arrow 140 in FIG. 1B; dotted arrow 240 in FIG. 2B) to the resource manager 102 (202 in FIG. 2B) the performance metrics collected and/or alerts when a performance metric for resource 2 has exceeded a pre-set value or threshold. As such, the resource manager 102 (202 in FIG. 2B) collects all the resource or performance metrics events for the individual resources 110 and 114 (resources 210 and 214 in FIG. 2B) that have a monitoring agent 134 and 136 (234 and 236 in FIG. 2B) running on them, respectively. However, since resource 3 (reference numeral 118 in FIG. 1B and 218 in FIG. 2B) and resource 4 (reference numeral 122 in FIG. 1B and 222 in FIG. 2B) do not have any monitoring agents on them, only the information collected by the monitoring agents 134 and 136 (234 and 236 in FIG. 2B) running on resource 1 (reference numeral 110 in FIG. 1B and 210 in FIG. 2B) and resource 2 (reference numeral 114 in FIG. 1B and 214 in FIG. 2B), respectively, gets passed or communicated to the resource manager 102 (202 in FIG. 2B). This means that if, for example, resource 4 (reference numeral 122 in FIG. 1B and 222 in FIG. 2B) is slow (shown by the symbol 132 in FIG. 1B and 232 in FIG. 2B) due to a performance metric, for instance, CPU usage, that has been exceeded, this performance information may not get communicated to the resource manager 102 (202 in FIG. 2B), thus, not addressing the problem with respect to resource 4. Further, the resource manager 102 (202 in FIG. 2B) does not actively communicate the information to the transaction manager 106 (206 in FIG. 2B), but the information from the resource manager 102 (202 in FIG. 2B) may be communicated (double-sided arrow 104 in FIG. 1B, double-sided arrow 204 in FIG. 2B) to the transaction manager 106 (206 in FIG. 2B), if requested by the transaction manager 106 (206 in FIG. 2B).

In another embodiment, as outlined in FIG. 2A and shown in FIG. 2B, the invention provides a method 200A and 200B of monitoring a business transaction serviced by one or more resources, which includes pre-configuring with policies or rules at least a respective instrumented protocol encoding-decoding component (instrumented SOAP stack) corresponding to a respective resource of the one or more resources, such that the respective resource inspects an aggregate value for a performance metric in a respective protocol (SOAP) response header received from a succeeding resource. Further, the respective resource sends an alert to the resource manager when the pre-set value for the performance metric for the succeeding resource is exceeded. Accordingly, the instrumented SOAP stack that is pre-configured with policies or rules further acts as a monitoring agent and is able to send an alert to the resource manager on behalf of a peer resource when a determination is made that a pre-set value or pre-configured threshold for a performance metric on the peer resource has been exceeded. An alert may be implemented as a simple message that is sent directly to the resource manager indicating which metric has exceeded a threshold or pre-set value, probably containing the measured value and the pre-configured threshold or pre-set value. For instance, as shown in FIG. 2B, resource 2 (reference numeral 214) has an instrumented SOAP stack that is also pre-configured with policies (symbol 242 in FIG. 2B) to act as a monitoring agent on behalf of resource 3 (reference numeral 218) and/or resource 4 (reference numeral 222) in FIG. 2B. In particular, if certain criteria or values have been pre-set for either resource 3 and resource 4 or both resources 3 and 4 in FIG. 2B, then the instrumented and pre-configured SOAP stack on resource 2 (reference numeral 214) can compare the performance metrics collected and received from resource 4 (reference numeral 222) and/or resource 3 (reference numeral 218) and can determine whether or not a particular pre-set threshold value or criterion has been met for either resource 3 and/or resource 4 in FIG. 2B, so that resource 2 (reference numeral 214) can send out an alert (dotted arrow 244) to the resource manager 202 on behalf of the resource (be it resource 3 (reference numeral 218) and/or resource 4 (reference numeral 222), thus, alerting the resource manager 202 in FIG. 2B of the met pre-set threshold values and/or criteria, unlike the situation described earlier for FIG. 1B. Accordingly, in an embodiment, only a few of the instrumented SOAP stacks are pre-configured with policies to act as monitoring agents to report events on behalf of other resources, thus, minimizing the number of monitoring agents required to monitor the resources throughout the network and minimizing any connectivity issues of allowing each and every single resource to communicate their status to a central monitoring infrastructure in addition to communicating to peers regarding regular business transactions. Further, in an embodiment, the resource monitoring infrastructure or resource manager 202 provides a graphical user interface, where the criteria or values for one or more performance metrics can be pre-set. Accordingly, when a transaction manager 206 requests monitoring information, it may ask for both specific performance metrics and for performance metrics when a certain pre-set threshold value has been exceeded. Further, a monitoring agent, such as monitoring agent 236, may still be installed on a resource (for instance, resource 2, reference numeral 214 in FIG. 2B) even if the instrumented SOAP stack on the resource 2, reference numeral 214, is pre-configured with policies (symbol 242) in order to compare and send alerts to the resource manager 202. For instance, a monitoring agent 236 may monitor a different set of performance or resource metrics than those gathered by the pre-configured and instrumented SOAP stack 242 on resources 2, reference numeral 214.

In another embodiment, as shown in FIGS. 1B and 2B, the invention provides different embodiments of a system 100B and 200B for monitoring resources servicing a business transaction in a service-oriented architecture, as described herein above. The system comprises one or more resources (110, 114, 118 and 122 in FIG. 1B and 210, 214, 218 and 222 in FIG. 2B) configured to service a business transaction, with one or more of the resources have deployed thereon an instrumented protocol stack, preferably, each of the resources having deployed thereon an instrumented protocol stack. The system further comprises a transaction manager (106 in FIG. 1B and 206 in FIG. 2B) having deployed thereon the instrumented protocol stack and being configured to issue in a protocol request header in a protocol request message sent (solid arrow 108 in FIG. 1B and 208 in FIG. 2B) to the four resources in FIGS. 1B and 2B to monitor one or more performance metrics for the business transaction serviced by the four resources. Further, in an embodiment, each of the four resources (shown in FIGS. 1B and 2B) is configured to collect the one or more performance metrics for the business transaction and to aggregate the one or more performance metrics in a protocol response header in a protocol response message that is sent to the transaction manager, where the protocol request header in the protocol request message is associated with a thread of execution for the business transaction, such that the protocol request header in the protocol request message is propagated to any other requests made within the same thread of execution for the business transaction. Accordingly, the protocol request header in the protocol request message is replicated through all exchanges associated with the business transaction, as described in the method hereinabove. The system further comprises a resource manager (102 in FIG. 1B and 202 in FIG. 2B) configured to collect one or more performance metric events from one or more monitoring agents (134 and 136 in FIG. 1B and 234 and 236 in FIG. 2B) deployed on the one or more resources, in particular, resources 1 and 2 as shown in FIGS. 1B and 2B. In an embodiment, the transaction manager (106 in FIG. 1B and 206 in FIG. 2B) is further configured to monitor one or more transaction metrics for the business transaction serviced by the one or more resources (110, 114, 118 and 122 in FIG. 1B and 210, 214, 218 and 222 in FIG. 2B) and is configured to analyze the one or more transaction metrics monitored for the one or more resources servicing the business transaction in view of the one or more performance metrics collected by the one or more resources, as described in the method hereinabove. In an embodiment, a respective preceding resource of the plurality of the one or more resources, for instance, resource 3 (118 in FIG. 1B and 218 in FIG. 2B) is configured to append a respective set of performance metrics to the protocol response header in the protocol response message received from a respective succeeding resource of the one or more resources, for instance, resource 4 (122 in FIG. 1B and 222 in FIG. 2B). In an embodiment, as shown in FIG. 2B, the instrumented protocol stack corresponding to a subset of the one or more resources, for instance, only resource 2 (214 in FIG. 2B) is pre-configured with policies (symbol 242) in order to compare an aggregate value of a performance metric in the protocol response header of a protocol response message received to a pre-set value for the performance metric, such that the pre-configured resource (for instance, resource 2, reference numeral 214) or resources send an alert to the resource manager 202 when the pre-set value for the performance metric is exceeded. In an embodiment, the instrumented protocol stack comprises an instrumented Simple Object Access Protocol (SOAP) stack, wherein the protocol request header comprises a Simple Object Access Protocol (SOAP) request header, wherein the protocol response header comprises a Simple Object Access Protocol (SOAP) response header, wherein the protocol request message comprises a Simple Object Access Protocol (SOAP) request message and wherein the protocol response message comprises a Simple Object Access Protocol (SOAP) response message.

In yet another embodiment, the invention provides a computer program product for monitoring metrics associated with a business transaction. Preferably, the computer program product is in a form accessible from the computer-usable or computer-readable medium, which provides program codes or instructions for use by or in connection with a computer or any instruction execution system. For the purposes of this description, a computer-usable or computer readable medium can be any apparatus that can contain or store the codes or instructions for use by or in connection with the instruction execution system, apparatus, or device. Preferably, the medium can include an electronic, magnetic, optical or semiconductor system (or apparatus or device). More preferably, the computer-readable medium can include a semiconductor or solid state memory, magnetic tape, a removable computer diskette, a random access memory (RAM), a read-only memory (ROM), a rigid magnetic disk and an optical disk. Further, examples of optical disks include compact disc-read only memory (CD-ROM), compact disc-read/write (CD-R/W) and digital versatile/video disc (DVD). The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The computer program product further comprises first program instructions to provide a transaction manager configured to specify, in a request header in a request message issued to one or more resources servicing a business transaction, collection of one or more performance metrics, each of the one or more resources and the transaction manager having deployed thereon an instrumented protocol stack. The computer program product further comprises second program instructions to collect the one or more performance metrics specified in the request message and third program instructions to send to the transaction manager in a response header in a response message the one or more performance metrics collected by the one or more resources servicing the business transaction. In an embodiment, the second program instructions further include instructions to associate the request header in the request message with a thread of execution for the business transaction and to propagate the request header in the request message to any other request messages made within the thread of execution for the business transaction. Further, in an embodiment, the second program instructions further include instructions to append a respective set of performance metrics to the response header in the response message received from a succeeding resource of the one or more resources and to send the response message to the transaction manager. The computer program product further comprises fourth program instructions to pre-configure the instrumented protocol stack deployed on the one or more resources with policies in order to compare an aggregate value of a performance metric of the one or more performance metrics in a respective response header received from a succeeding resource to a pre-set value for the performance metric and to send an alert to a resource manager when the pre-set value for the performance metric is exceeded. In an embodiment, the transaction manager is further configured to monitor one or more transaction metrics associated with the business transaction and is further configured to analyze the one or more transaction metrics monitored for the business transaction in view of the one or more performance metrics collected from the one or more resources. In an embodiment, the instrumented protocol stack comprises an instrumented Simple Object Access Protocol (SOAP) stack, and the request header comprises a Simple Object Access Protocol (SOAP) request header. Further, the response header comprises a Simple Object Access Protocol (SOAP) response header, the request message comprises a Simple Object Access Protocol (SOAP) request message and the response message comprises a Simple Object Access Protocol (SOAP) response message. In an embodiment, each of the first, second, third and fourth program instructions are stored on the computer readable medium.

Figure 4:
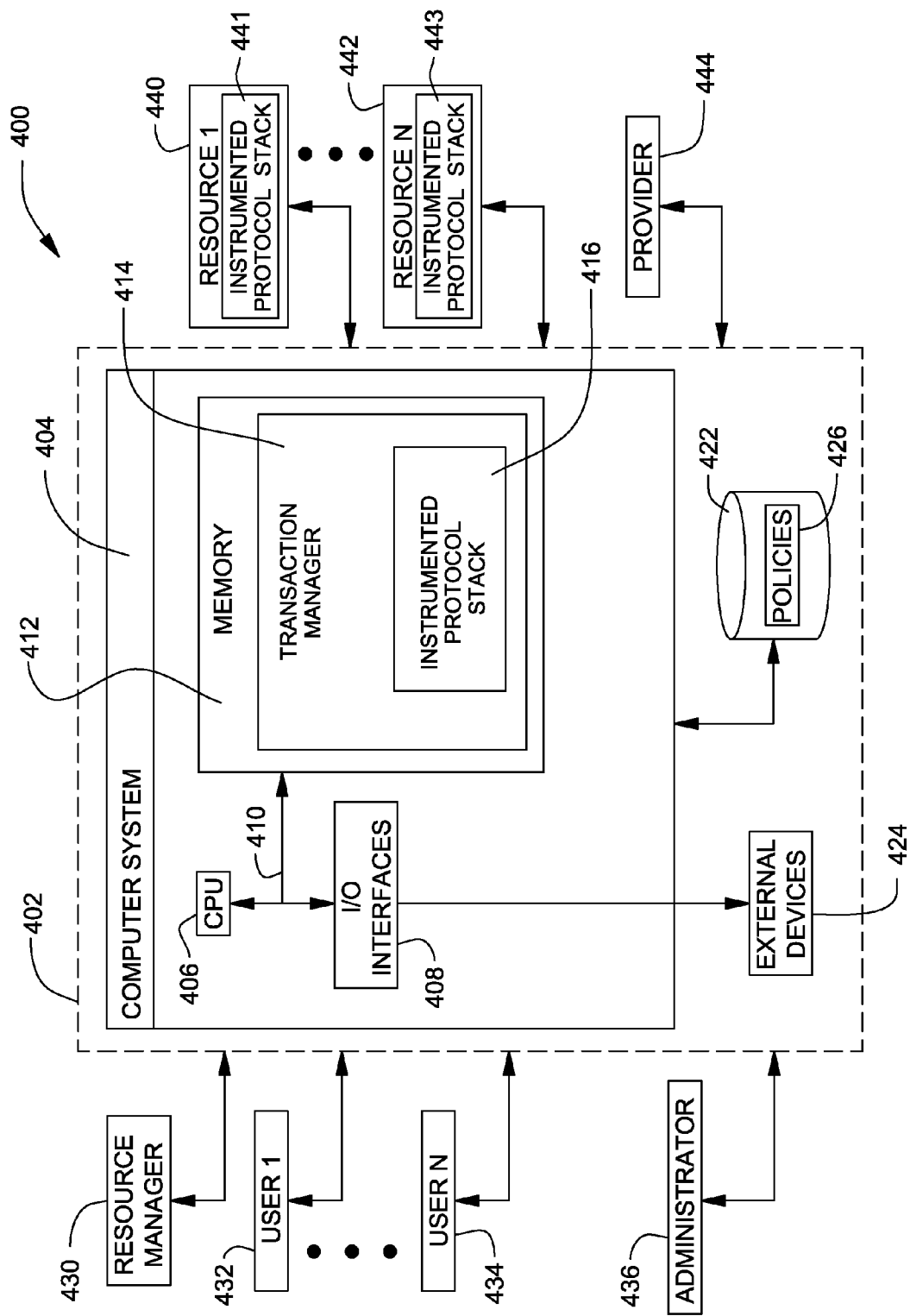
FIG. 4 is a schematic block system diagram illustrating an embodiment of a computer infrastructure for monitoring resources servicing a business transaction in a service-oriented architecture, in accordance with an embodiment of the present invention.

Referring now to FIG. 4, there is illustrated a system 400 for determining an optimal configuration and associated operational costs for implementing a capacity management service, according to the present invention. As depicted, system 400 includes a computer infrastructure 402, which is intended to represent any type of computer architecture that is maintained in a secure environment (i.e., for which access control is enforced). As shown, infrastructure 402 includes a computer system 404 that typically represents a server or the like. It should be understood, however, that although not shown, other hardware and software components (e.g., additional computer systems, such as, application servers, administrative servers, routers, firewalls, etc.) could be included in infrastructure 402.

In general, a user (any one of user 1, reference numeral 432 through user N, reference numeral 434) may interface with infrastructure 402 for performing a business transaction. Similarly, any an administrator 436 and/or service provider 444 can interface with infrastructure 402 for accessing the system 404 in order to monitor resources, such as resource 1, reference numeral 440 through resource N, reference numeral 442 servicing a business transaction. Further, resource 1 (reference numeral 440) through resource N (reference numeral 442) may interface with infrastructure 402 for servicing the business transaction. As shown, resource 1 (reference numeral 440) has an instrumented protocol stack 441 and resource N (reference numeral 442) has an instrumented protocol stack 443 deployed thereon. Further, the transaction manager 414 also has an instrumented protocol stack 416 deployed thereon. As such, each of the resources, preferably, has an instrumented protocol stack for communicating with the transaction manager 414. Furthermore, the resource manager 430 can also interface with computer system 404 for providing the transaction manager 414 any information that may be requested regarding any resource metric collected by the resource manager through monitoring agents and/or resources acting as monitoring agents. In general, the parties could access infrastructure 402 directly, or over a network via interfaces (e.g., client web browsers) loaded on computerized devices (e.g., personal computers, laptops, handheld devices, etc.). In the case of the latter, the network can be any type of network such as the Internet or can be any other network, such as, a local area network (LAN), a wide area network (WAN), a virtual private network (VPN), etc. In any event, communication with infrastructure 402 could occur via a direct hard-wired connection (e.g., serial port), or via an addressable connection that may utilize any combination of wire line and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, the parties could utilize an Internet service provider to establish connectivity to infrastructure 402. It should be understood that under the present invention, infrastructure 402 could be owned and/or operated by a party such as provider 444, or by an independent entity. Regardless, use of infrastructure 402 and the teachings described herein could be offered to the parties on a subscription or fee-basis. In either scenario, an administrator 436 could support and configure infrastructure 402.

Computer system or server 404 is shown to include a CPU (hereinafter "processing unit 406"), a memory 412, a bus 410, and input/output (I/O) interfaces 408. Further, computer system 400 is shown in communication with external I/O devices 424 and storage system 422. In an embodiment as shown, the storage system 422 includes policies or rules 426 that may be used to pre-configure the respective instrumented protocol stacks (441 through 443) on any of the respective resources 1 through N (reference numerals 440 and 442), such that the pre-configured resource may additionally act as a monitoring agent. In general, processing unit 406 executes computer program codes, such as the transaction manager application 414, which includes an instrumented protocol stack 416, in an embodiment, an instrumented SOAP stack. While executing the transaction manager application 414, the processing unit 406 can read and/or write data, to/from memory 412, storage system 422, and/or I/O interfaces 408. Bus 410 provides a communication link between each of the components in computer system 400. External devices 424 can include any devices (e.g., keyboard, pointing device, display, etc.) that enable a user to interact with computer system 400 and/or any devices (e.g., network card, modem, etc.) that enable computer system 400 to communicate with one or more other computing devices.

Computer infrastructure 402 is only illustrative of various types of computer infrastructures for implementing the invention. For example, in one embodiment, computer infrastructure 402 includes two or more computing devices (e.g., a server cluster) that communicate over a network to perform the various process steps of the invention. Moreover, computer system 400 is only representative of various possible computer systems that can include numerous combinations of hardware. To this extent, in other embodiments, computer system 400 can include any specific purpose computing article of manufacture comprising hardware and/or computer program code for performing specific functions, any computing article of manufacture that includes a combination of specific purpose and general purpose hardware/software, or the like. In each case, the program code and hardware can be created using standard programming and engineering techniques, respectively. Moreover, processing unit 406 may include a single processing unit, or be distributed across one or more processing units in one or more locations, e.g., on a client and server. Similarly, memory 412 and/or storage system 422 can include any combination of various types of data storage and/or transmission media that reside at one or more physical locations. Further, I/O interfaces 408 can include any system for exchanging information with one or more external devices 424. Still further, it is understood that one or more additional components (e.g., system software, math co-processing unit, etc., not shown in FIG. 4) can be included in computer system 400. Similarly, it is understood that the one or more external devices 424 (e.g., a display) and/or storage system(s) 422 could be contained within computer system 404, and not externally as shown. Program instructions are stored in a functional form in a computer readable storage for execution by CPU 406 in memory 412. In these illustrative examples, storage system 422 is an example of a computer readable storage medium.

Storage system 422 can be any type of system (e.g., a database) capable of storing information or data, such as policies 426 that provide rules, such as, what a pre-configured protocol stack on a resource should do when a pre-set resource metric has been exceeded. To this extent, storage system 422 could include one or more storage devices, such as a magnetic disk drive or an optical disk drive. In another embodiment, storage system 422 includes data distributed across, for example, a local area network (LAN), wide area network (WAN) or a storage area network (SAN) (not shown). Although not shown, additional components, such as cache memory, communication systems, system software, etc., may be incorporated into computer system 400.

Accordingly, in an embodiment, the transaction manager 414 analyzes the transaction metrics monitored for the business transaction from an end user's perspective (for instance, any of user 1, reference numeral 432 through user N, reference numeral 434) in view of the performance metrics collected from the resource 1 (reference numeral 440) through resource N (reference numeral 442) and tries to make sense of the performance information along with any transaction metrics it may have collected for the resources 1 through N. For instance, if the CPU on a resource is maxed out but the resource is still meeting a desired target time for completing a transaction request, the performance metric for that resource may be considered acceptable. Further, the transaction manager 414 may obtain information from the resource manager 430, for instance, when a resource servicing a particular transaction does not meet a desired target time. In particular, the transaction manager 414 may be able to figure out a reason based on what performance metrics or data are conveyed by the resource manager 430 (that is, through data obtained through the monitoring agents or through resources that are pre-configured with policies to act as monitoring agents). For instance, the transaction manager 414 may figure out that the reason why a transaction did not meet a desired target time was due to hard disk failure or excessive disk usage, etc. Furthermore, the data collected by the resource manager 430 and the transaction manager 414 may be passed on to an administrator 436 and/or provider 444, thus, providing the administrator 436 and/or provider 444 with a better more comprehensive understanding of the resources.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of monitoring computer resources processing a business transaction in a service oriented architecture, said method comprising the steps of:

requesting, by a transaction manager executing on a CPU in a computer, in a protocol request header in a protocol request message of one or more protocol request messages, a collection of one or more performance metrics for at least one computer resource in said computer resources processing said business transaction, wherein said transaction manager monitors said business transaction processed by said computer resources in the service oriented architecture, wherein each of said computer resources and said transaction manager have deployed thereon a protocol encoding-decoding component that sends said one or more protocol request messages requesting the collection of said one or more performance metrics and receives one or more protocol response messages containing said one or more performance metrics collected in a protocol response header in the one or more protocol response messages, wherein a first computer resource processing said business transaction in said computer resources receives said protocol request message with said protocol request header from a second computer resource processing said business transaction in said computer resources, the first computer resource adds said protocol request header to a new protocol request message, and the first computer resource sends the new protocol request message with said protocol request header to a third computer resource processing said business transaction in said computer resources; and receiving, by said transaction manager executing on the CPU in the computer, in the one or more protocol response messages having said protocol response header containing said one or more performance metrics collected by said at least one computer resource in said computer resources processing said business transaction.

2. The method according to claim 1 comprising:
monitoring, by said transaction manager, one or more transaction metrics associated with said business transaction; and
analyzing, by said transaction manager, said one or more transaction metrics monitored for said business transaction in view of said one or more performance metrics collected from said computer resources.

3. The method according to claim 2 further comprising the step of:
collecting, by a resource manager, one or more performance metric events from one or more monitoring agents deployed on said computer resources.

4. The method according to claim 3 further comprising:
adding said protocol request header in said protocol request message to any other requests made within a same thread of execution for said business transaction; wherein said protocol request header in said protocol request message is replicated through all exchanges associated with said business transaction and wherein said first computer resource in the service oriented architecture, that receives said protocol request header in said protocol request message from said second computer resource, is configured to process protocol request messages before other processing occurs in said third computer resource or process said protocol request message at a same time with said other processing by said third computer resource.

5. The method according to claim 4 further comprising:
pre-configuring at least a respective protocol encoding-decoding component corresponding to said first computer resource in said computer resources with policies, wherein said first computer resource inspects an aggregate value for a performance metric of said one or more performance metrics in a protocol response header received from said second computer resource and wherein said first computer resource sends an alert to said resource manager when a pre-set value for said performance metric is exceeded.

6. The method according to claim 5, wherein said receiving step further comprises the step of:
receiving in said protocol response header of said protocol response message an aggregation of each of said one or more performance metrics corresponding to a computer resource in said computer resources processing said any other requests made within a thread of execution for said business transaction.

7. The method according to claim 6, wherein a protocol for said protocol encoding-decoding component comprises Simple Object Access Protocol (SOAP).

8. The method according to claim 1, wherein said receiving step further comprises the step of:
receiving a set of performance metrics in said protocol request header in a protocol request message received from said second computer resource, wherein said second computer resource adds a first portion of the set of performance metrics to said protocol request header, said second computer resource adds a second portion of said set of performance metrics to the protocol request header, and said third computer resource adds a third portion of said set of performance metrics to said protocol request header.

9. The method of claim 1, wherein said one or more computer resources is selected from one of a computer hardware and software in a computer.

10. A computer system for monitoring computer resources processing a business transaction in a service oriented architecture, each of said computer resources having a protocol stack comprising:
 a computer system comprising a CPU, a computer readable storage, and a memory;
 said computer resources, wherein said computer resources process said business transaction, said computer resources having deployed thereon a protocol stack; and
 program instructions for a transaction manager to issue in a protocol request header in a protocol request message to said computer resources to monitor one or more performance metrics for said business transaction processed by said computer resources, wherein each of said computer resources collects said one or more performance metrics for said business transaction and to aggregate said one or more performance metrics in a protocol response header in a protocol response message that is received by said transaction manager, wherein said protocol request header in said protocol request message is associated with a thread of execution for said business transaction and wherein said protocol request header in said protocol request message is propagated to any other requests made within said thread of execution for said business transaction, such that said protocol request header in said protocol request message is replicated through all exchanges associated with said business transaction, wherein a first computer resource processing said business transaction in said computer resources receives said protocol request message with said protocol request header from a second computer resource processing said business transaction in said computer resources, the first computer resource adds said protocol request header to a new protocol request message, and the first computer resource sends the new protocol request message with said protocol request header to a third computer resource processing said business transaction in said computer resources, and wherein the program instructions are stored in a functional form in the computer readable storage for execution by the CPU via the memory in the computer system.

11. The computer system according to claim 10, further comprising:
 a resource manager configured to collect one or more performance metric events from monitoring agents deployed on said computer resources.

12. The computer system according to claim 11, wherein said transaction manager monitors one or more transaction metrics for said business transaction processed by said computer resources and analyzes said one or more transaction metrics monitored for said computer resources processing said business transaction in view of said one or more performance metrics collected by said computer resources.

13. The computer system according to claim 12, wherein each computer resource in said computer resources adds a portion of said one or more performance metrics to said protocol response header in said protocol response message.

14. The computer system according to claim 13, wherein said protocol stack corresponding to said computer resources is pre-configured with policies in order to compare an aggregate value of a performance metric of said one or more performance metrics received in said protocol response header to a pre-set value for said performance metric, and wherein said computer resources send an alert to said resource manager when said pre-set value for said performance metric is exceeded.

15. The computer system according to claim 14, wherein said protocol stack comprises a Simple Object Access Protocol (SOAP) stack; wherein said protocol request header comprises a Simple Object Access Protocol (SOAP) request header; wherein said protocol response header comprises a Simple Object Access Protocol (SOAP) response header; wherein said protocol request message comprises a Simple Object Access Protocol (SOAP) request message; and wherein said protocol response message comprises a Simple Object Access Protocol (SOAP) response message.

16. A computer program product for monitoring computer resources processing a business transaction, each of the computer resources having a protocol stack, said computer program product comprising:
 a computer readable storage device;
 first program instructions for a transaction manager to send a request message to collect one or more performance metrics specified in said request message, wherein said one or more performance metrics are collected by computer resources processing said business transaction, each of said computer resources having deployed thereon said protocol stack wherein a first computer resource processing said business transaction in said computer resources receives a protocol request message with a protocol request header from a second computer resource processing said business transaction in said computer resources, the first computer resource adds said protocol request header to a new protocol request message, and the first computer resource sends the new protocol request message with the protocol request header to a third computer resource processing said business transaction in said computer resources;
 second program instructions for said transaction manager to receive in a response header in a response message said one or more performance metrics collected by said computer resources processing said business transaction, wherein said first and second program instructions are stored on said computer readable storage device.

17. The computer program product according to claim 16 further comprising:
 third program instructions to pre-configure said protocol stack deployed on said computer resources with policies in order to compare an aggregate value of a performance metric of said one or more performance metrics in a respective response header received from a succeeding computer resource to a pre-set value for said performance metric and to send an alert to a computer resource manager when said pre-set value for said performance metric is exceeded, said third program instructions being stored on said computer readable storage device.

18. The computer program product according to claim 17, wherein said first program instructions further include instructions to place said protocol request header in said protocol request message to any other requests made within a thread of execution for said business transaction; wherein said protocol request header in said protocol request message is replicated through all exchanges associated with said business transaction and wherein said first computer resource in the service oriented architecture, that receives said protocol request header in said protocol request message from said second computer resource, is configured to process protocol request messages before other processing occurs in said second computer resource or process said protocol request message at a same time with said other processing by said second computer resource.

19. The computer program product according to claim 18, wherein said first program instructions further include instructions to add a respective set of performance metrics to said response header in said response message received from said succeeding computer resource in said computer resources and to send said response message to said transaction manager.

20. The computer program product according to claim 19, wherein said transaction manager monitors one or more transaction metrics associated with said business transaction and is further configured to analyze said one or more transaction metrics monitored for said business transaction in view of said one or more performance metrics collected from said computer resources.

* * * * *